Figure 1:
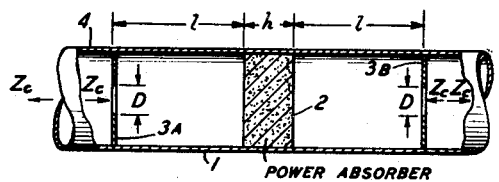

April 16, 1940.  A. E. BOWEN  2,197,122

GUIDED WAVE TRANSMISSION

Filed June 18, 1937   2 Sheets-Sheet 1

INVENTOR
A. E. BOWEN
BY
ATTORNEY

April 16, 1940. A. E. BOWEN 2,197,122
GUIDED WAVE TRANSMISSION
Filed June 18, 1937 2 Sheets—Sheet 2

$H_{11}$ WAVE $E_{01}$ WAVE $H_{01}$ WAVE $E_{11}$ WAVE

INVENTOR
A. E. BOWEN
BY
ATTORNEY

Patented Apr. 16, 1940

2,197,122

UNITED STATES PATENT OFFICE 2,197,122

GUIDED WAVE TRANSMISSION

Arnold E. Bowen, Red Bank, N. J., assignor to Bell Telephone Laboratories, Incorporated, New York, N. Y., a corporation of New York Application June 18, 1937, Serial No. 148,839

17 Claims. (Cl. 178—44)

The present invention relates to electromagnetic wave transmission systems, more particularly to systems utilizing dielectrically guided waves, and it is concerned principally but in its broader aspects not exclusively, with new and improved devices for attenuating such waves.

Dielectric guide systems of various kinds have been described in some detail heretofore in such applications for Letters Patent as those of G. C. Southworth which issued on September 13, 1938, as U. S. Patents No. 2,129,711 and No. 2,129,712, and that of S. A. Schelkunoff which issued on February 21, 1939, as U. S. Patent 2,147,717, and in the papers by J. R. Carson et al. and Schelkunoff appearing in the April 1936 issue of the Bell System Technical Journal. The dielectric guide itself has taken a wide variety of forms, but typical of guides disclosed heretofore is one consisting of a rod of dielectric material and another consisting essentially of a metallic pipe containing a solid or gaseous dielectric medium.

A form of dielectric guide that lends itself well to the purposes in hand is one consisting of a metallic pipe, evacuated or filled with air, and it is in terms of such a guide that my invention will be described. It is to be understood, however, that this is for illustrative purposes only and that the invention is not to be limited to this specific form of guide.

Dielectrically guided wave transmission as disclosed in the applications and publication cited above, is unique in several respects. In the first place it is evident that the provision of separate conducting paths for the go-and-return flow of conduction current is not an essential characteristic whereas in conventional guided wave systems known heretofore it is. Secondly, in each instance it has been observed that the guide presents the attenuation characteristic of a high-pass filter, that is, there is a certain critical or cut-off frequency separating the propagation range from a lower frequency range of zero or highly attenuated transmission. Moreover, it has been found that the critical frequency and the phase velocity of dielectrically guided waves are both functions of the transverse dimensions of the guide.

Dielectrically guided waves are capable of transmission in an indefinitely large number of forms or types, each type being distinguished by the characteristic spacial distribution and interrelation of the component electric and magnetic fields comprising the waves.

Although as noted, there are an indefinite number of types of dielectrically guided waves, it has been found that they fall into either of two broad classes. In the one class, assuming now for the sake of simplicity that the guide is in the form of a metallic pipe, the electric component of the wave is transverse to the pipe and at no point does it have a longitudinal component excepting as the pipe is not quite a perfect conductor. The magnetic component, on the other hand, has both transverse and longitudinal components. This class will be designated as "transverse electric" waves or TE waves. In the other class, the magnetic component is transverse to the pipe and at no point does it have a longitudinal component, but the electric component has in general both transverse and longitudinal components. This class will be designated as "transverse magnetic" waves or TM waves.

The various possible types of dielectrically guided waves in each of these two classes may be identified and distinguished from each other by their order and by their mode. The order of the wave is determined by the manner in which the field intensity varies circumferentially around the axis of the guide, whereas the mode is determined by the manner of its variation with distance from the axis of the guide. Reference is made here to the Schelkunoff patent, supra, for a more complete discussion of this matter of mode and order. The usual convention is herein adopted of designating a TE wave by $H_{nm}$, where $n$ represents the order and $m$ the mode. Similarly a TM wave of the $n$th order and $m$th mode will be represented by $E_{nm}$.

The principal purpose of the present invention is to provide suitable devices for attenuating dielectrically guided waves transmitted within metallic pipe guides. A further purpose is to provide attenuating devices of this nature which are at the same time designed for impedance matching, that is, to dissipate a portion of the incident wave energy and to transmit a portion of that energy without reflecting any of it back toward the source of the wave.

Figure 8:
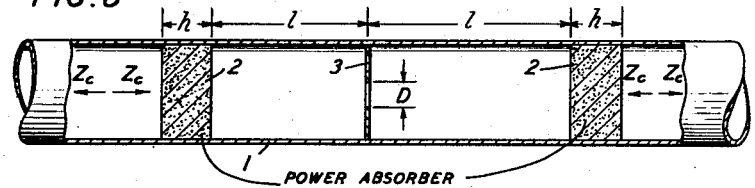
Figure 9:
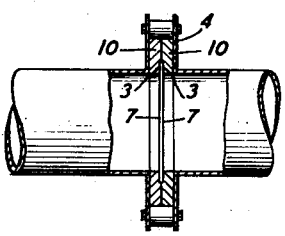
Figure 10A:
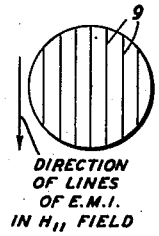
Figure 10B:
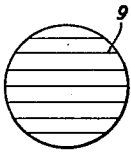
Figure 10C:
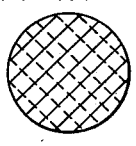
Figure 11:
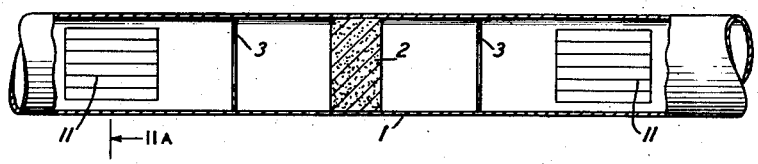
Figure 11A:
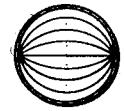
Figure 12:
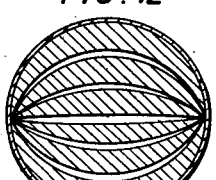
Figure 13:
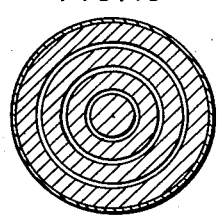

The invention will be better understood by reference to the following specification and the accompanying drawings, in which:

Figs. 1 to 7A relate to attenuators involving an absorbing element and two or more reactance elements;

Fig. 8 shows an attenuator with two absorbers and one reactance element;

Figs. 9 to 10C relate to an absorber of continuously variable value;

Figs. 11 and 11A relate to conformal gratings to be used with the attenuators;

Figs. 12 to 15 relate to conformal irises to be used with the attenuators; and

Figure 16:
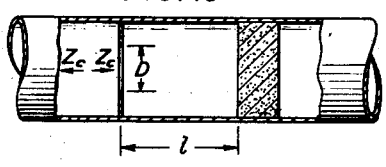
Figure 17:
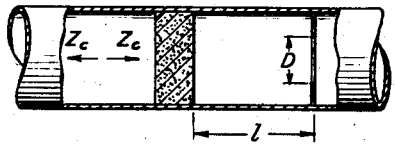
Figure 14:
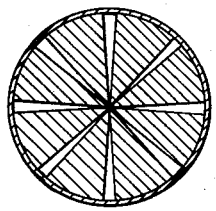
Figure 15:
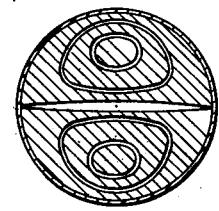

Figs. 16 and 17 show simplified forms of attenuators.

Referring now to Fig. 1 there is shown a typical attenuator in accordance with the present invention comprising two reactive elements with power absorbing means disposed between them. The attenuator, comprising a section of tubular metallic pipe 1, is shown connected serially in a dielectric guide consisting essentially of a tubular metallic pipe 4 of the same diameter. The power absorber 2 comprises a disc or plug of material such as carbon having a fairly poor conductivity. The reactive elements comprise apertured metallic diaphragms or irises 3A and 3B disposed with the power absorber between them and each spaced a distance $l$ from the surface thereof. The attenuator, properly adjusted, is adapted to attenuate waves impressed on either end of it and to attenuate such waves without giving rise to energy reflection back toward the source of the applied waves.

A qualitative understanding of the action of the device of Fig. 1 as a reflectionless attenuator may be had as follows: In Fig. 1 let us consider a dielectrically guided wave progressing from the left and incident on the iris 3A. At this iris it may be considered that there is a reflected wave made up of two components, the one associated with the metallic surface of the iris 3A and the other with the central circular aperture of the iris. It is apparent that the relative amplitudes of these two components can be made whatever we choose, for if the diameter D of the iris aperture is made to approach the diameter of the guide the former component can be made indefinitely small, while if D approaches zero that component can be made much larger than the one associated with the open part of the iris. The phase of the component reflected from the metallic face of the iris is more or less fixed. On the other hand, the phase of the second component depends upon the distance from the iris 3A to the power absorber 2, on the material and the thickness of the power absorber, and on the distance from the power absorber to iris 3B. By a suitable combination of iris apertures, distance from iris to absorber, and material and thickness of the latter, the two reflected components can be made equal in amplitude but opposite in phase so that they cancel each other and the device is reflectionless. The attenuating action arises of course by the fact that the wave in passing through the device must pass through the power absorber 2 in which some of this energy is dissipated as heat.

Where the attenuator of Fig. 1 is connected between two sections of a wave guide of the same diameter and of the same characteristic impedance $Z_c$ in both directions from the attenuator, the attenuator is symmetrical, the apertures of irises 3A and 3B are the same and so are the distances $l$ from the irises to the power absorber. In this case there are only the two variables $l$ and D to be properly correlated by trial and error. If the attenuator is to be connected between guide sections of different characteristic impedance, the attenuator assemblage must be unsymmetrical if it is to be reflectionless; and in general the iris apertures and their distances from the absorber, respectively, will be different.

Figure 2:
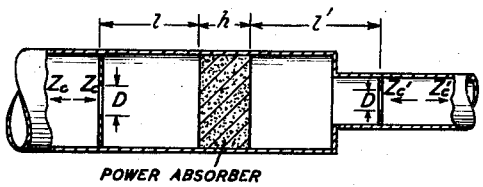
Figure 3:
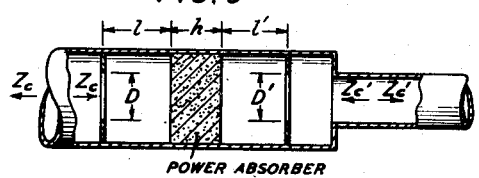
Figure 4:
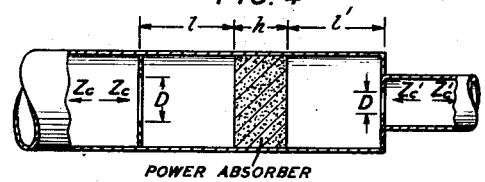

If the attenuator is inserted at the junction between guides of different diameter, one of the irises can be located in either the smaller or the larger guide, or it may be coincident with the junction, as shown in Figs. 2, 3 and 4. In any case, allowance must be made for the equivalent reactance of the annular ring forming the junction between the two guide sections.

Figure 5:
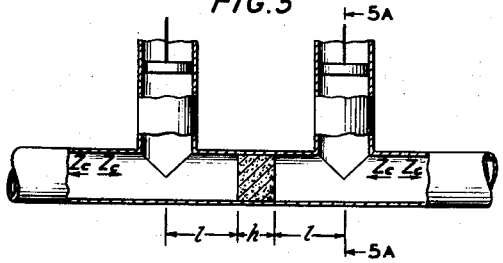
Figure 5A:
Figure 6:
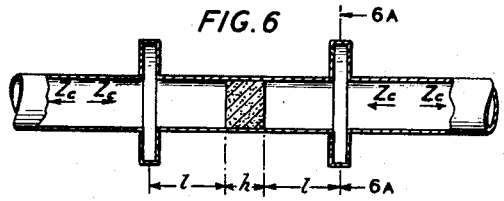
Figure 6A:
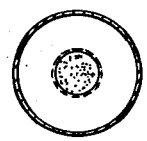
Figure 7:
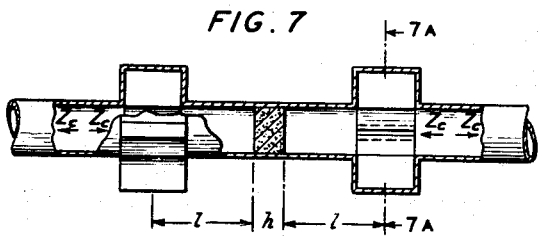
Figure 7A:
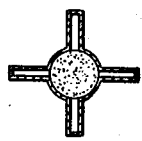

The attenuator of Fig. 1 can be described in general terms as consisting of a power absorber in combination with two reactive elements, where the reactive elements are in the form of irises. The reactive elements, however, may take other forms and in Figs. 5 and 5A they are shown as side chambers terminated in reflecting pistons. On the other hand, for waves having a longitudinal component of electric force, i. e., transverse magnetic waves, they may consist of closed metallic chambers each surrounding a circumferential slot in the wall of the guide, as shown in Figs. 6 and 6A. Again, for waves possessing a longitudinal component of magnetic force, i. e., transverse electric waves, the reactive element may take on the form of two or more longitudinal slots in the wall of the guide each closed by a rectangular chamber, as shown in Figs. 7 and 7A.

In all of these cases the spacing from iris to absorber is dependent on the wave-length but in general it is not simply related thereto.

The type of attenuator shown in Fig. 8 may be described generally as a combination of two absorbing elements 2 and an intermediate reactive element 3. The latter element may take on any one of the forms described in connection with the preceding figures, that is, it may be a simple iris 3, as illustrated, or some form of side chamber.

The power absorbers described above may be spoken of rather generally as sections of wave guide filled with poorly conducting material. One form which these might assume could be paper or other insulating material impregnated with colloidal graphite or it might be a thin disc of a mixture of graphite with a binding material such as clay. In this form the power absorber would be suitable for use in an attenuator for any type of wave. The feature of adjustability of attenuation can be secured by supplying a number of the discs of different thickness adaptable to be used singly or in combination and so proportioned as to yield the desired steps in attenuation constant. Since dielectrically guided waves may be of different types, the power absorber may assume a form which is especially adapted to a particular wave type. For example, if the applied wave is of the $H_{11}$ type the power absorber may consist of a rod of resistance material extending across a diameter of the guide or it may consist of a fixed concentrated resistor serially connected in a wire extending across a diameter. In general, the power absorber may be given any of the forms heretofore described for power absorbers used in terminating a wave guide.

Figure 9A:
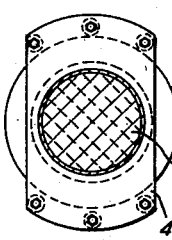

The power absorbers so far described have been of fixed resistance and to secure a change in attenuation it is necessary to replace one power absorber with another. In this case, changes in attenuation can be secured only in steps and not continuously. A continuously variable power absorbing device is useful in this connection and one such device applicable to an $H_{11}$ wave is shown in Figs. 9 and 9A. It consists of two thin sheets 7 of insulating material placed back to back. On the faces there are ruled a number of fine parallel lines 9 using India ink, aquadag or equivalent material. The lines might also be of fine resistance wire cemented to the insluating disc, or they might be formed by sputtering a metal onto the insulating disc through a suitable mask. The sheets are held in rings 18 which permit their rotation in opposite senses. In Fig. 10A the two sheets are shown with zero rotation so that the ruled lines may be parallel to each other and to the lines of electric force in the $H_{11}$ field. Under this condition, currents are induced in the lines and there is a consequent power loss. In Fig. 10B the two sheets are shown rotated each through 90 degrees so that the lines are perpendicular to the lines of electric force. In this condition, the power absorbed will be substantially zero since there will be no current induced in the lines. Finally, Fig. 10C shows the two sheets rotated to an intermediate position where power intermediate between zero and the maximum is absorbed. Since the sheets can be moved continuously, the arrangement of Figs. 9 and 9A provides a power absorber of continuously variable resistance.

The attenuators so far described are suitable for use in a wave guide system with cylindrical guides of circular cross-section and the attenuator elements have correspondingly been described as circular. Attenuators with the same general features can be constructed in guides of other than circular cross-section as for instance, square or rectangular. In the case of some types of waves, notably the $H_{11}$ wave, material advantages in the way of simplifying the mechanical features of the irises and other components of the attenuator can be secured by using square or rectangular guides. When using cylindrical guides an ordinary multi-leaved photographic iris with a circular aperture continuously adjustable over a wide range has been found satisfactory. For other applications where continuous adjustment is not required, the iris may consist simply of a sheet of copper with a circular aperture cut in it, the sheet being clamped into the wave guide in any convenient manner.

Simple iris diaphragms of the kind hereinbefore described have proved highly satisfactory where the transverse dimensions of the guide and the operating frequency are such that only one type of dielectrically guided wave can be propagated. This condition obtains, where the guide consists of a tubular metallic pipe, when the ratio of the wave-length in air to the diameter of the guide lies between 1.71 and 1.31, the one type of wave that can then be propagated being the $H_{11}$ type. When the ratio is less than 1.31 waves of the $E_{01}$ type can also be propagated, and as the ratio is made progressively smaller still other modes and orders of waves can be propagated. This aspect of guided wave transmission is described in some detail in my copending application Serial No. 133,810, filed March 30, 1937, which issued November 21, 1939, as U. S. Patent No. 2,180,950. Thus, when an $H_{11}$ wave is incident on a circular iris the iris not only reflects some of the $H_{11}$ wave in its original form but it may also tend to generate other modes and orders of waves which, if the wave-length and the diameter of the guide are such that they can be supported, will propagate energy away from the iris. The effect of this is that the simple qualitative argument as to the action taking place in the attenuator is not always applicable and the statement that an adjustment can be found such that no energy is reflected back towards the source from the attenuator is not always strictly true, for energy may be reflected back in the form of other modes and orders of waves. This difficulty may be avoided in either of two ways.

In the first way the attenuator is "boxed in" between metallic gratings which prevent the passage of these waves away from the attenuator into the line in the same manner as described in my patent, *supra*. In Figs. 11 and 11A there is shown an attenuator so segregated. Here 2 and 3 refer to the power absorber and the irises as in Fig. 1, while the elements 11 are axially elongated "conformal" gratings. The shape of the elements in the grating may take on a variety of forms but a suitable one for the $H_{11}$ wave is that shown by Fig. 11A which is a cross-section on the line AA of Fig. 11. In this case the gratings are designed so that the electric field is at all points perpendicular to the metallic surfaces and they are therefore suitable for passing $H_{11}$ waves. The complete assemblage constitutes an attenuator for these waves, and the distortion products, if produced, are confined to the space between the gratings 11. The distance between these gratings should preferably be adjustable so that the amplitude of the distortion products in this interval can be minimized.

A second means of minimizing wave type distortion is in the use of conformal irises or shutters in place of the simple circular iris. A conformal shutter may be defined in general as formed of a group of sheets of conducting material placed in a plane across a guide, the edges of the sheets being everywhere perpendicular to the lines of electric force in the wave, the arrangement of the sheets being symmetrical about the axis of symmetry of the lines of electric force. Examples of such shutters for $H_{11}$, $E_{01}$, $H_{01}$ and $E_{11}$ waves are shown in Figs. 12 to 15, respectively, in which the cross-hatched portions are sheet conductors. When the reflecting surfaces of the shutter are arranged in the manner thus indicated, partial reflection of the wave is attained with less wave distortion than results from a simple circular iris. In general the greater the number of elements in a conformal iris the higher the order and mode of the resulting distortion products and the smaller are their amplitudes. Although a conformal iris made up of a large number of elements may be difficult to construct, nevertheless it will be apparent that any step from the simple circular iris towards a complex conformal iris will represent an improvement so that even very simple approximations to a conformal iris will offer considerable advantages electrically over the simple circular iris.

While the invention thus far has been described on the basis of impedance matching so that there will be no reflection, there are cases where a limited amount of reflection is allowable, in which case the special form of attenuator shown in Fig. 8 may be used. In this form the power absorbers 2 and the distance $l$ are so adjusted that when D is zero there is no reflection from the device. It terminates the guide in both directions. With this adjustment, the attenuation is of course infinite. As D is increased from zero some energy is allowed to pass through the device so that the attenuation decreases. At the same time, however, the conditions leading to an impedance match are upset so that the device is no longer reflectionless. As a practical matter, however, I find that it is possible to secure a variation in attenuation from infinity down to fairly small values without objectionable reflection simply by adjustment of the iris aperture.

Most of the attenuators which have so far been shown have been such that they offer a reflectionless attenuation in the wave guide for either direction of power flow through them. For some applications it will be sufficient that they be suitable for transmitting power in only one direction and in this case fewer elements are required. Thus, referring to Fig. 1, iris 3B can be omitted and the attenuator will consist of but one iris and a power absorber as in Figs. 16 and 17.

This invention has been described in broad terms only but it will be evident that many variations from the specific features and arrangements given may be introduced in connection with one type of dielectrically guided wave or another. It is to be understood however that all such variations and combinations come within the scope of this invention as set forth in the following claims.

What is claimed is:

1. In a dielectric wave guide system, an attenuator for dielectrically guided waves, comprising a reactance element followed by an absorber followed by a second reactance element, the impedance presented by said attenuator being dependent on the spacing of said elements and their impedance values, and the elements being so spaced apart with relation to their respective impedance values that there is impedance matching for power transmission in both directions.

2. An attenuator in accordance with claim 1 in which said reactance elements have the same reactance values.

3. An attenuator in accordance with claim 1 in which said absorber is a shunt resistance element.

4. An attenuator in accordance with claim 1 in which said reactance elements and said absorber are shunt elements.

5. In a dielectric wave guide system, an attenuator for dielectrically guided waves comprising an absorber, a reactance element and an absorber in the order named, the impedance presented by said attenuator being dependent on the impedance values of said absorbers and reactance element and on the spacing between them, the respective impedance values of said absorbers and reactance element being so correlated with reference to the distances separating them.

6. An attenuator in accordance with claim 5 in which said absorbers are in shunt to the wave guide.

7. An attenuator in accordance with claim 5 in which the two absorbers have identical values.

8. A combination in accordance with claim 1 in which each of said reactance elements comprises a conformal iris diaphragm.

9. In a dielectric wave guide system comprising a hollow metallic guide, several longitudinally spaced elements in shunt in said guide at least two of which are reactive elements, the elements being of such value and so spaced apart as to yield reflectionless attenuation for power flowing in both directions.

10. A wave guide carrying high frequency electromagnetic waves, a reactive, an absorptive and a reactive impedance succeeding each other so placed along the guide with relation to their impedance values as to yield desired attenuation and to match the impedance of the guide for at least one direction of wave propagation.

11. In a wave guide system, a hollow metallic wave guide, attenuating means comprising shunt reactances and shunt resistance inserted physically in the guide and so spaced apart as to match the characteristic impedance of the guide.

12. An attenuator for dielectrically guided waves within a metallic pipe comprising three elements, two of which are alike in respect that both are either absorptive or reactive, the third being different in the same respect, said elements being disposed within the metallic pipe with the third intermediate the other two, the impedance presented by said attenuator being dependent on the spacing and impedance values of said elements, said elements being so spaced apart with relation to their respective impedance values that there is impedance matching for power transmission in both directions.

13. An attenuator in accordance with claim 12 in which said reactive element or each of said reactive elements comprises a conformal iris diaphragm.

14. An attenuator in accordance with claim 12 in which said elements which are alike have the same values.

15. An attenuator for dielectrically guided waves within a metallic pipe comprising an absorptive element and a reactive element, said reactive element having such reactance and being so positioned with reference to the absorptive element as to suppress reflection in at least one direction of transmission through the attenuator.

16. A conformal grating for dielectrically guided waves within a metallic pipe comprising a multiplicity of metallic sheets so disposed within said pipe as to form metallically bounded longitudinal passages such that at any cross-section of the grating each of said sheets is orthogonal to the transverse electric field of a type of guided wave present in the wave incident on said grating, whereby waves of said type are freely transmitted through said grating and waves of other types are suppressed.

17. A conformal iris for dielectrically guided waves within a metallic pipe comprising a metallic diaphragm across the pipe having elongated apertures therein that are at all points orthogonal to the transverse electric field of an incident wave of a particular type, whereby said incident wave is transmitted through said iris and incident waves of other types are relatively impeded.

ARNOLD E. BOWEN.

CERTIFICATE OF CORRECTION.

Patent No. 2,197,122.                                April 16, 1940.

ARNOLD E. BOWEN.

It is hereby certified that error appears in the printed specification of the above numbered patent requiring correction as follows: Page 4, first column, line 49, claim 5, after the word "them" and before the period insert --as to give impedance matching--; and that the said Letters Patent should be read with this correction therein that the same may conform to the record of the case in the Patent Office.

Signed and sealed this 20th day of March, A. D. 1945.

Leslie Frazer (Seal)                          Acting Commissioner of Patents.